(No Model.) 2 Sheets—Sheet 1.

J. H. KEYSER.
GAS BURNER FOR HEATING AND COOKING PURPOSES.

No. 432,881. Patented July 22, 1890.

Attest:
F. H. Schott
Edward T. Fenwick

Inventor
John H. Keyser
by his Attorneys
Mason, Fenwick & Lawrence (No Model.) 2 Sheets—Sheet 2.

J. H. KEYSER.
GAS BURNER FOR HEATING AND COOKING PURPOSES.

No. 432,881. Patented July 22, 1890.

UNITED STATES PATENT OFFICE.

JOHN H. KEYSER, OF NEW YORK, N. Y.

GAS-BURNER FOR HEATING AND COOKING PURPOSES.

SPECIFICATION forming part of Letters Patent No. 432,881, dated July 22, 1890.

Application filed February 14, 1890. Serial No. 340,401. (No model.)

*To all whom it may concern:*

Be it known that I, JOHN H. KEYSER, a citizen of the United States, residing at New York city, in the county of New York and State of New York, have invented certain new and useful Improvements in Gas-Burners for Heating and Cooking Purposes; and I do hereby declare the following to be a full, clear, and exact description of the invention, such as will enable others skilled in the art to which it appertains to make and use the same.

This invention relates to gas-burners which operate on the "Bunsen" principle, wherein air is mixed with the gas in the passage of the gas to a distributing-chamber; and it consists, first, in a portable gas cooking and heating burner formed with certain novel features of construction, as hereinafter described, and two cast portions united and made gas-tight at their junction by fastenings and packing material; second, in a combined portable cooking and heating burner formed with novel features of construction, as will be hereinafter described, and two cast portions united and made gas-tight at their junction by suitable fastenings and packing material, and, third, in a portable combined gas cooking and heating burner, stand, and kitchen-utensil support formed with novel features of construction, as will be hereinafter described, and two cast portions united and made gas-tight at their junction by suitable fastenings and packing material.

Figure 1:
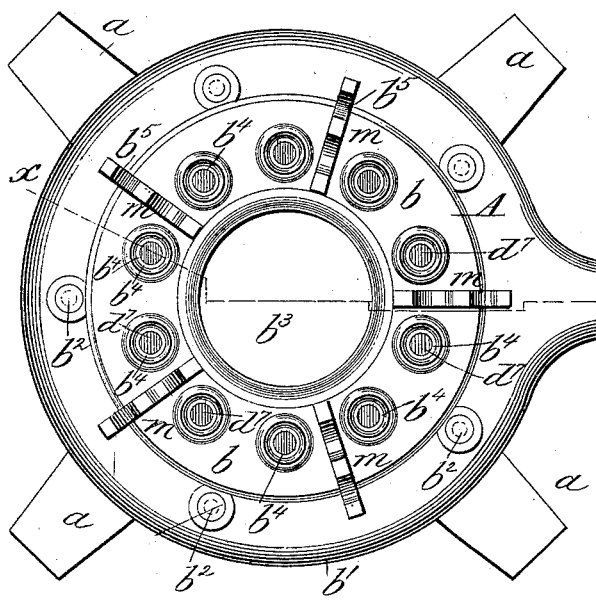
Figure 3:
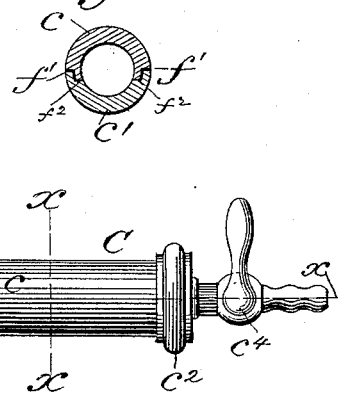
Figure 6:
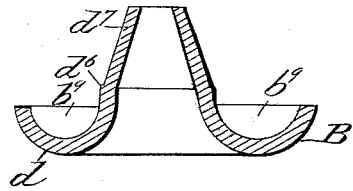
Figure 2:
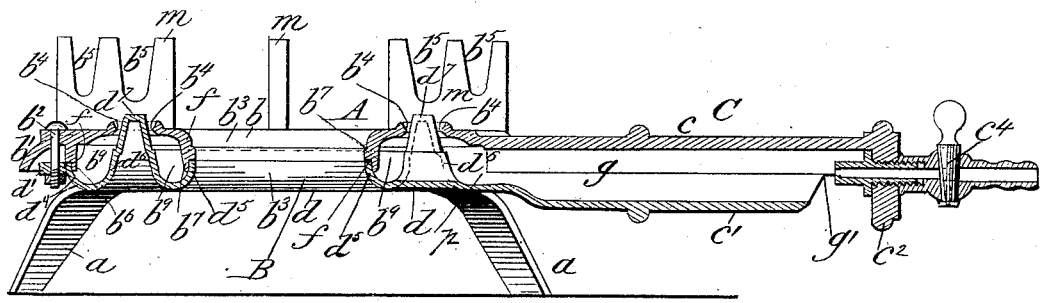
Figure 5:
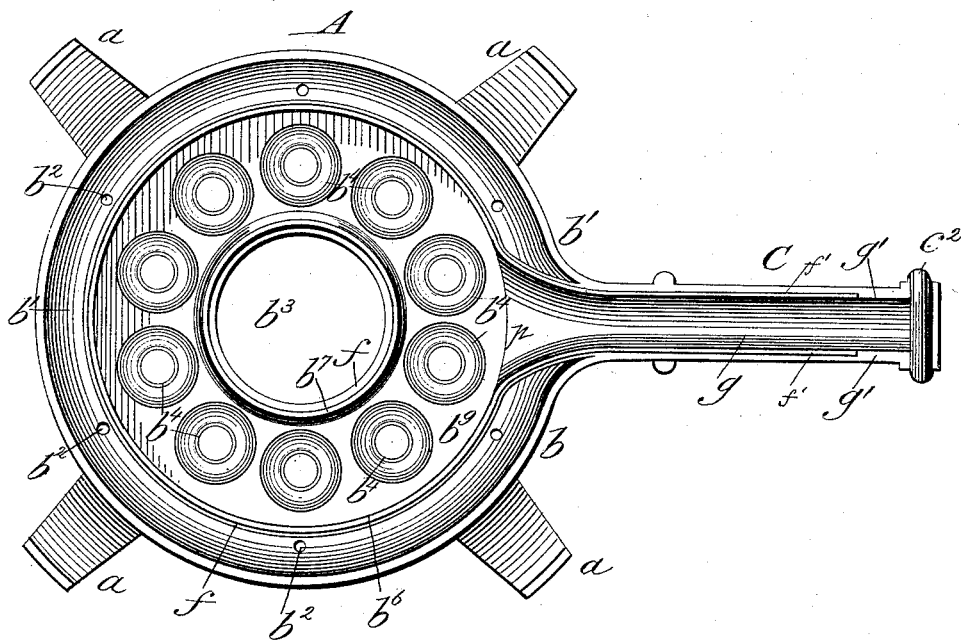
Figure 4:
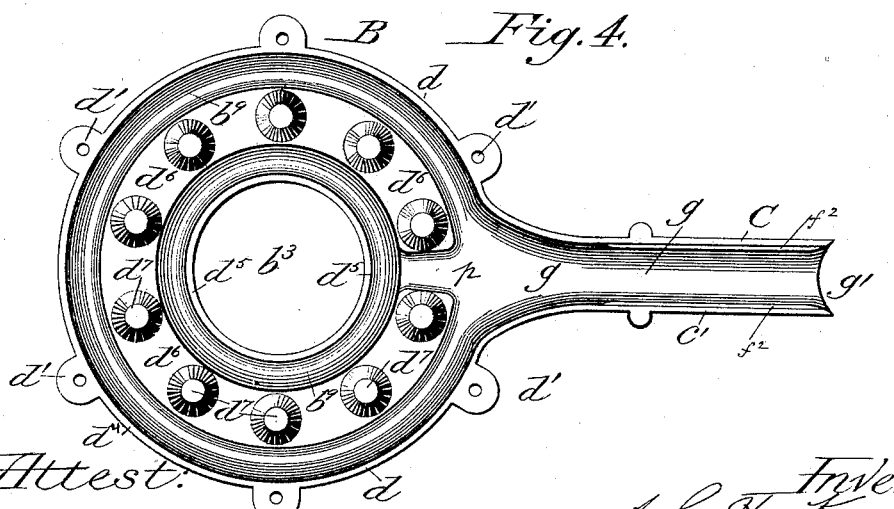

In the accompanying drawings, Figure 1 is a top view, and Fig. 2 a vertical cross-section showing my invention. This section is taken on the line $x'$ $x'$ of Fig. 1. Fig. 3 is a detail cross-section in the line $x$ $x$ of Fig. 1. Fig. 4 is a top view of the lower casting. Fig. 5 is an inverted plan of the upper casting. Fig. 6 is a detail section showing a modification of the "spuds" or projections.

A in the drawings is the upper, and B the lower, casting, constituting when united my improved gas-burner, which has a central annular air and heat circulation passage $b^3$ through it, and an annular receiving and distributing, mixed air and gas chamber $b^9$ between its top and bottom surfaces, and its pendent junction-flanges $b^6$ $b^7$ of the upper casting, and the upwardly-extended flanges $d^4$ $d^5$ of the lower casting, said chamber serving for the mixed air and gas to flow through in the passage of the same from the gas and air supplies, and said chamber being in communication with a circle of gas-burner openings or passages $b^4$ in the upper casting around the annular opening $b^3$, and also with the air and gas mixing and conducting channel $g$ of a laterally-extended tubular arm or handle C, formed by semi-tubular rabbeted portions $c$ $c'$ of the respective castings A and B, which channel is in communication with the cock $c^4$ of the gas-supply, and with the atmosphere by an air-opening $g'$ near the discharging end of said cock.

A more definite description of the castings is as follows: The casting A is provided with legs or feet $a$, on which it stands; and it consists of a horizontally-arranged plate $b$, terminated at its outer edge with a downwardly-sloping and overhanging skirting $b'$, through which a series of bolt-holes $b^2$ are made. In the center of this plate the large annular opening $b^3$ is formed, preferably with an upward flare. Outside and around said opening the series of annular burner-openings $b^4$ are formed so as to extend down through the plate, and preferably flare downwardly and upwardly. Outside the central opening a series of radial supports $m$, for kitchen utensils to rest upon, are extended upwardly from the plate, the same being preferably bifurcated at top, as indicated at $b^5$, so as to allow more perfect contact and circulation of the gas-flame about the utensil resting on the supports. Below the surface of the plate $b$ the depending or downwardly-extended transversely-curved flanges $b^6$ $b^7$ are formed on the plate, the same having rabbet or angular joint-seats $f f$ for reception of the upwardly-extended flanges $d^4$ $d^5$ of the lower cast portion B, and also cement or other suitable packing material. One of these flanges is annular and formed at the margin of the central annular opening $b^3$, and the other, which is nearly annular, is formed at a point a considerable distance outside said opening, say about one or one and a half inch from the outer edge of the plate $b$. Between these flanges a nearly-annular recess of semicircular form in cross-section is formed, and this recess forms, with a corresponding recess between the said flanges $d^4$ $d^5$ of the lower casting B, the nearly annular mixed gas and air circulating and distributing chamber $b^9$.

At one point on the periphery of the skirting $b^2$ of the plate $b$ and in communication at $p$ with the chamber $b^9$ is formed one half $c$ of a hollow mixed air and gas conducting channel $g$ of the cylindrical arm or handle C. This half of the handle is rabbetted at $f'$, and terminates at its gas-receiving end in a circular centrally-perforated collar $c^2$, into the screw-threaded perforation of which the gas-supply and cut-off or regulation-cock $c^4$ is screwed.

The lower casting B consists of a horizontally-arranged plate $d$, having perforated ears $d'$. Through this plate the annular central opening $b^3$, preferably flared downwardly, is formed, said opening corresponding in diameter with the similar opening $b^3$ of plate $b$ and coinciding with it. On this plate the curved annular and nearly annular flanges $d^4$ $d^5$, extending upwardly and fitting into the seats $f$ $f$ of the flanges $b^6$ $b^7$ of plate $b$, are also formed, and between the flanges $b^6$ $b^7$ and $d^4$ $d^5$ a narrow elevated nearly-annular ridge $d^6$ is cast upon the plate $d$. On this ridge and concentric, respectively, with the gas-burner openings $b^4$ are cast a series of upwardly-extending spuds or projections $d^7$. These spuds may be solid throughout, but it is preferable to make them hollow for some distance above the upper surface of the ridge, and they may be either closed or open at top, as preferred. These spuds are of less diameter than the burner-openings, and they are preferably tapering, but may be straight up and down, and they may extend up to or some distance above the top surface of the upper casting A; but it is preferable to have them extend a short distance above said surface, as shown.

Around the spuds, when the two plates are fastened together, narrow annular burner-openings or gas channel-ways, as $b^4$, exist, and the gas is burned in a series of separated thin rings outside the central opening $b^3$ of the castings A B, and the flames from these several rings mingle together, and with air which comes in laterally above plate $b$ between said plate and a cooking utensil resting on the supports, and with air which also comes up through the central annular opening $b^3$ of the castings A and B.

The ridge $d^6$ divides the spaces between the flanges $d^4$ $d^5$ and $b^6$ $b^7$ to a certain height into an annular and nearly annular portion, and these annular and nearly annular spaces between the flanges $d^4$ $d^5$ and $d^6$ $d^7$ form the lower portion of the gas and air mixing chamber $b^9$, the upper portion of said chamber being undivided by the ridge.

At a point on the periphery of the plate $d$, corresponding to that where the half portion $c$ of the handle C is cast on plate $b$, the other half $c'$ of the gas and air conducting handle C is cast. This half $c'$ of the handle is rabbeted at $f^2$, so as to match half $c$, and is made shorter than the half $c$, in order that an entrance-passage $g'$ shall be formed when the halves are brought together, said passage $g'$ being for the admission of air to mix with the gas on its passage to the circulating and distributing chamber $b^9$. The rabbets $f'$ $f^2$ receive cement or other joint-packing material. The inflowing gas passes around the ridge in two circles, while it flows in a larger volume in one circle or body above said ridge, because said ridge completely divides the lower portion of the chamber $b^9$ into two nearly-annular ways from the bottom to a short distance up above the plate $d$, while it only extends slightly into said chamber above the point of junction $f$, as represented.

The gas-burner might be made of rectangular form, either square or oblong, and if in either of such forms all the circular parts of the castings A and B, except the burner-passages $b^4$, would be formed on straight lines.

In some uses of the burner the legs, or both the legs and utensil-supports, might be left off, as when, for instance, it is employed for heating purposes simply, and is supported in a stove or fire-chamber wholly by its conducting-arm or handle.

By my invention the cost of manufacture is reduced, while a very effective portable gas cooking and heating structure operating on the Bunsen principle and possessing all the capabilities of analogous operating structures is produced.

What I claim as my invention is—

1. A gas-burner formed of two flanged castings having a half hollow handle on each and one of the castings provided with circular gas-burner openings and the other with homogeneous cast-metal spuds or projections upon a base which is elevated and forms a nearly-circular ridge between the inner and outer flanges of the casting, so that there is a nearly annular air and gas mixing channel-way between the said spuds, their base, and the inner flanges, and also between said spuds, their base, and the outer flanges, and so that the spuds or projections extend up into the said circular gas-burner openings, but do not fill them, and the two castings forming, when united, an air and gas mixing conducting-arm and a circulation and distributing mixed air and gas chamber divided into two nearly annular channel-ways, substantially as described.

2. The combined gas-burner and stand formed of the two cast portions A and B, the portion A comprising plate $b$, with skirting and feet or legs, openings $b^3$ $b^4$, flanges $b^6$ $b^7$, having a recess between them, and the half $c$ of a gas and air mixing and conducting handle, and the portion B comprising the plate $d$, opening $b^3$, flanges $d^4$ $d^5$, ridge $d^6$, with spaces between it and the flanges, the spuds or projections $d^7$, and the other half $c'$ of the gas and air mixing conducting arm or handle, said half $c'$ being constructed to form the air-opening $g'$, and the two castings unitedly forming an air and gas mixing conducting and distributing channel-way and chamber from the supply-cock to a series of annular gas-burner passages which are partially filled with the spuds or projections, substantially as described.

3. The combined gas-burner stand and support formed of the two cast portions A B, the portion A comprising plate $b$, with skirting, feet, or legs and supports $m$, openings $b^3$ $b^4$, flanges $b^6$ $b^7$, having recess between them and the half $c$ of the gas and air mixing and conducting arm or handle, and the portion B comprising the plate $d$, opening $b^3$, flanges $d^4$ $d^5$, having space between them, ridge $d^6$, having spaces between it and the flanges, spuds or projections $d^7$, the half $c'$ of the gas and air conducting arm or handle constructed to form air-opening $g'$, and the two castings unitedly forming air and gas conducting, mixing, and distributing channel-way and chamber from the supply-cock to the series of burner-passages which are partly filled with the spuds or projections, substantially as described.

4. The gas-burner formed of the two cast portions A B, the portion A comprising plate $b$, openings $b^3$ $b^4$, flanges $b^6$ $b^7$, having recess between them, and the half $c$ of a gas and air mixing and conducting arm or handle, and the portion B comprising plate $d$, opening $b^3$, flanges $d^4$ $d^5$, ridge $d^6$, having spaces between it and the flanges, the spuds or projections $d^7$, and the other half $c'$ of the gas and air mixing and conducting arm or handle constructed to form air-opening $g'$, and the two castings unitedly forming air and gas mixing, conducting, and distributing channel-way and chamber from the supply-cock to a series of burner-passages which are partly filled with the spuds or projections, substantially as described.

In testimony whereof I hereunto affix my signature in presence of two witnesses.

JOHN H. KEYSER.

Witnesses:
WILLIAM TURTON,
HORACE METCALF.